US009348248B2

(12) United States Patent
Qiu et al.

(10) Patent No.: US 9,348,248 B2
(45) Date of Patent: May 24, 2016

(54) PREPARING AMORPHOUS POLYESTER RESIN EMULSIONS

(71) Applicant: Xerox Corporation, Norwalk, CT (US)

(72) Inventors: Shigang Qiu, Toronto (CA); Richard P N Veregin, Mississauga (CA); Kimberly D Nosella, Mississauga (CA); Santiago Faucher, Oakville (CA); Cuong Vong, Hamilton (CA); Enno E Agur, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/578,508

(22) Filed: Dec. 22, 2014

(65) Prior Publication Data

US 2015/0104743 A1 Apr. 16, 2015

Related U.S. Application Data

(62) Division of application No. 13/742,065, filed on Jan. 15, 2013, now Pat. No. 8,916,320.

(51) Int. Cl.

| | |
|---|---|
| ***B32B 5/16*** | (2006.01) |
| ***G03G 9/00*** | (2006.01) |
| ***G03G 9/097*** | (2006.01) |
| ***G03G 9/08*** | (2006.01) |
| ***G03G 9/087*** | (2006.01) |
| ***G03G 9/09*** | (2006.01) |

(52) U.S. Cl.

CPC .......... *G03G 9/09733* (2013.01); *G03G 9/0802* (2013.01); *G03G 9/0804* (2013.01); *G03G 9/0819* (2013.01); *G03G 9/0823* (2013.01); *G03G 9/0825* (2013.01); *G03G 9/08755* (2013.01); *G03G 9/08795* (2013.01); *G03G 9/08797* (2013.01); *G03G 9/0904* (2013.01); *Y10T 428/2982* (2015.01)

(58) Field of Classification Search

CPC . G03G 9/0802; G03G 9/0804; G03G 9/0823; G03G 9/08755; G03G 9/0904; G03G 9/08797; G03G 9/0819; G03G 9/0825; G03G 9/09733; G03G 9/08795

USPC ........................................ 430/108.4; 428/402

See application file for complete search history.

(56) References Cited

U.S. PATENT DOCUMENTS

2005/0181296 A1 8/2005 Robinson et al.
2008/0107990 A1 * 5/2008 Field .................. G03G 9/08755 430/109.4

* cited by examiner

*Primary Examiner* — William Cheung
(74) *Attorney, Agent, or Firm* — Marylou J. Lavoie, Esq. LLC

(57) ABSTRACT

A process for making a latex emulsion including contacting at least one amorphous polyester resin with at least two organic solvents to form a resin mixture, adding a neutralizing agent, and deionized water to the resin mixture, removing the solvent from the formed latex, and separating the solvent from water. Further, the process is carried out above the resin Tg for making the latex, which drives the latex particle size under 100 nm, where toners made from the latex show improved charging performance.

13 Claims, No Drawings

PREPARING AMORPHOUS POLYESTER RESIN EMULSIONS

FIELD

The present disclosure relates to processes for producing resin emulsions useful in producing toners. More specifically, solvent-based processes provide latex emulsions of amorphous polyester resin particles of small size.

BACKGROUND

Numerous processes are within the purview of those skilled in the art for preparing toner. Emulsion aggregation (EA) is one such method. Emulsion aggregation techniques may involve a batch or semi-continuous emulsion polymerization, as disclosed in, for example, U.S. Pat. No. 5,853,943, the disclosure of which is hereby incorporated by reference in entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210 and 5,994,020, and U.S. Pub. No. 2008/0107989, the disclosure of each of which hereby is incorporated by reference in entirety.

Polyester toners can utilize amorphous and crystalline polyester resins as illustrated, for example, in U.S. Pub. No. 2008/0153027, the disclosure of which is hereby incorporated by reference in entirety. The incorporation of the polyesters into toner requires formulation into emulsions prepared by, for example, batch processes containing solvent, for example, solvent flash emulsification which is a time and energy-consuming process.

Solvent-less latex emulsions have been formed in either a batch or extrusion process through the addition of a neutralizing solution, a surfactant solution and water to a thermally softened resin as illustrated, for example, in U.S. Pub. Nos. 2009/0208864 and 2009/0246680, the disclosure of each of which hereby is incorporated by reference in entirety. However, certain amorphous resins may be difficult to process without the use of a solvent because some resins do not have a sharp melting point and exhibit substantial viscosities, which may work against the formation of emulsions. In addition, certain amorphous resins are more susceptible to molecular weight degradation in the solvent-free process.

Solvents may be added to amorphous resins to reduce the viscosity and to permit necessary reorientation of chain end, which may stabilize and form particles which lead to the formation of stable latexes.

Previous single-solvent and two-solvent processes are known to produce latex particles of sizes of 140 to 230 nm (see, e.g., U.S. Pub. Nos. 20110200930 and 20110281215, the disclosure of each of which hereby is incorporated by reference in entirety), which may not be suitable for effective dispersion of toners comprising high solid loading of, for example, carbon black pigment particles. It would be advantageous to provide a solvent-based process for the preparation of latex resins, particularly latex resins formed from low molecular weight and high molecular weight amorphous resins that have a particle size of 100 nm or less.

SUMMARY

The instant disclosure describes a process for making a latex emulsion suitable for use in a toner composition comprising at least one amorphous polyester resin and at least two organic solvents to form a resin mixture, including that the process is carried out above the resin $T_g$, which drives the latex particle size of 100 nm or less. Further, toners made from the latex made by the process show improved charging performance.

In embodiments, a method for making an amorphous resin latex is disclosed including combining an amorphous resin, at least two solvents, a base and water to form a mixture, heating the mixture at a temperature near to or greater than the $T_g$ of the amorphous resin to form an emulsion, and evaporating the solvents from the emulsion, where the resulting resin latex has a particle size of 100 nm or less.

In embodiments, a method for making an amorphous resin latex is disclosed including combining an amorphous resin, at least methyl ethyl ketone (MEK) and a second solvent, a base and water to form a mixture, where the resin to solvent ratio is from about 10:7 to about 10:20 (wt:wt), heating the mixture at a temperature near to or greater than the $T_g$ of the amorphous resin to form an emulsion and evaporating the solvents from the emulsion, where the resulting resin latex has a particle size of 100 nm or less.

In embodiments, a method for making a hyperpigmented toner is disclosed including mixing a composition comprising a low molecular weight (LMW) amorphous resin emulsion, a high molecular weight (HMW) amorphous resin emulsion, a crystalline resin emulsion, a wax dispersion, and a color pigment dispersion, optionally adding a flocculant thereto, aggregating the particles in the emulsion; freezing the aggregation process; coalescing the particles; and cooling the slurry to room temperature to form a toner preparation; wherein the resulting toner particles comprise a higher parent and additive charges as compared to a toner made from the same reagents but with a particle size of 100 nm or larger; and where the amorphous resins are made from a process which includes:

i) combining an amorphous resin, at least two solvents, a first base and water to form a mixture;
ii) heating the mixture at a temperature close to or greater than the $T_g$ of the amorphous resin to form an emulsion; and
iii) evaporating the solvents from the emulsion, where the resin to solvent ratio for the LMW amorphous resin is from about 10:7 to about 10:15 and the resin to solvent ratio for the HMW amorphous resin is from about 10:8 to about 10:20, and where the LMW and HMW amorphous resin particle sizes are 100 nm or less; and adding a base and water to form a resin emulsion.

In embodiments, a toner produced by the method above is disclosed, where the toner comprises an optional core-shell structure.

DETAILED DESCRIPTION

Ultra low melt (ULM) EA toners typically contain two types of amorphous resins (high molecular weight (HMW) and low molecular weight (LMW) amorphous resins). The amorphous resins can account for about 75 wt % of the toner composition. A formulation of 10/5/1 (resin/MEK/isopropyl alcohol (IPA)) for amorphous LMW resin, 10/6.5/1.5 for amorphous HMW resin and a 40° C. temperature process for both produces latexes with a particle size of about 180 nm to about 230 nm, which may be used to make ULM toner with a toner particle size of 5 to 7 μm. It is possible to make smaller latex of about 180 nm in size by increasing the solvent ratio. However, the phase inversion emulsification (PIE) formulation with a high solvent ratio for smaller latex of about 100 nm in size is not robust, showing poor repeatability, including that the formulation is not scalable.

In embodiments, the present method improves toner charging performance of higher pigment loading in the toner formulation (e.g., increased pigment loading of about 45% over conventional toner) as compared to toner made with resin particles of 100 nm or larger in size. While not being bound by theory, low toner mass area (TMA) toner having a smaller particle sized latex (i.e., 100 nm or less) allows for better dispersion of pigment particles, and thus, improves dielectric loss as compared to toner made with resin particles of 100 nm or greater in size. Again, while not being bound by theory, the small size latex contributes more surface area with the same acid groups, resulting in higher toner surface charge as compared to toner made with resin particles of 100 nm or larger in size.

In embodiments, a method for making an amorphous resin latex is disclosed including combining an amorphous resin, at least two solvents, a base and water to form a mixture, heating the mixture at a temperature near to or greater than the $T_g$ of the amorphous resin to form an emulsion and evaporating the solvents from the emulsion, wherein the resulting resin latex has a particle size of less than 100 nm.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating," and, "matching," or grammatic variations thereof, have generally acceptable definitions or at the least, are understood to have the same meaning as, "about."

Currently, ULM polyester toners result in a benchmark Minimum Fix Temperature (MFT) which is reduced by about 20° C. as compared to conventional EA toners. In embodiments, an ULM toner of the present disclosure may have an MFT of from about 100° C. to about 130° C., from about 105° C. to about 125° C., from about 110° C. to about 120° C.

As used herein, "hyperpigmented," means a toner having high pigment loading at low toner mass per unit area (TMA), for example, such toners may have an increase in pigment loading of at least about 25%, at least about 35%, at least about 45%, at least about 55% or more relative to conventional EA toners (e.g., toners having pigment loadings of 6% or lower by weight of toner), hence, for example, at least about 7.5% by weight of toner. In embodiments, a hyperpigmented toner as used herein is any new formulation wherein the amount of pigment is at least about 1.2 times that found in a control or known toner, at least about 1.3 times, at least about 1.4 times, at least about 1.5 times or more pigment as found in control or known formulation.

Resins

Any resin may be utilized in forming a latex emulsion of the present disclosure. In embodiments, the resins may be an amorphous resin, a crystalline resin, and/or a combination thereof. In embodiments, the resin may be a polyester resin, including the resins described, for example, in U.S. Pat. Nos. 6,593,049 and 6,756,176, the disclosure of each of which hereby is incorporated by reference in entirety. Suitable resins also may include a mixture of an amorphous polyester resin and a crystalline polyester resin as described in U.S. Pat. No. 6,830,860, the disclosure of which is hereby incorporated by reference in entirety. Suitable resins may include a mixture of high molecular and low molecular weight amorphous polyester resins.

In embodiments, the resin may be a polyester resin formed by reacting a diol with a diacid in the presence of an optional catalyst.

For forming a crystalline polyester, suitable organic diols include aliphatic diols with from about 2 to about 36 carbon atoms, such as, 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like, including structural isomers thereof. The aliphatic diol may be, for example, selected in an amount of from about 40 to about 60 mole percent, from about 42 to about 55 mole percent, from about 45 to about 53 mole percent, and optionally, a second diol can be selected in an amount of from about 0 to about 10 mole percent, from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent, from about 42 to about 52 mole percent, from about 45 to about 50 mole percent, and optionally, a second diacid may be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present, for example, in an amount of from about 1 to about 50 percent by weight of the toner components, from about 5 to about 35 percent by weight of the toner components. The crystalline resin may possess various melting points of, for example, from about 30° C. to about 120° C., from about 50° C. to about 90° C. The crystalline resin may have a number average molecular weight (Mn), as measured by gel permeation chromatography (GPC)

of, for example, from about 1,000 to about 50,000, from about 2,000 to about 25,000, and a weight average molecular weight (Mw) of, for example, from about 2,000 to about 100,000, from about 3,000 to about 80,000, as determined by GPC. The molecular weight distribution (Mw/Mn) of the crystalline resin may be, for example, from about 2 to about 6, from about 3 to about 4.

Examples of diacids or diesters including vinyl diacids or vinyl diesters, utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene and combinations thereof. The amount of organic diols selected can vary, and may be present, for example, in an amount from about 40 to about 60 mole percent of the resin, from about 42 to about 55 mole percent of the resin, from about 45 to about 53 mole percent of the resin.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly (co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly (co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly (co-propoxylated bisphenol co-ethoxylated bisphenol co-itaconate), poly(1,2-propylene itaconate), and combinations thereof.

In embodiments, a suitable polyester resin may be an amorphous polyester, such as, a poly(propoxylated bisphenol A co-fumarate) resin. Examples include those disclosed in U.S. Pat. No. 6,063,827, the disclosure of which is hereby incorporated by reference in entirety.

Suitable crystalline resins which may be utilized, optionally, in combination with an amorphous resin as described above, include those disclosed in U.S. Pub. No. 2006/0222991, the disclosure of which is hereby incorporated by reference in entirety. In embodiments, a suitable crystalline resin may include a resin formed of ethylene glycol and a mixture of dodecanedioic acid and fumaric acid co-monomers.

The amorphous resin may be present, for example, in an amount of from about 30 to about 100 percent by weight of the toner components, from about 40 to about 95 percent by weight of the toner components. In embodiments, the amorphous resin or combination of amorphous resins utilized in the latex may have a glass transition temperature (Tg) of from about 30° C. to about 80° C., from about 35° C. to about 70° C. In further embodiments, the combined resins utilized in the latex may have a melt viscosity of from about 10 to about 1,000,000 Pa*S at about 130° C., from about 50 to about 100,000 Pa*S.

One, two or more resins may be used. In embodiments, where two or more resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin).

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

In embodiments, a suitable toner of the present disclosure may include at least two amorphous polyester resins, a high molecular weight resin and a low molecular weight resin. As used herein, a high molecular weight (HMW) amorphous resin may have a weight average molecular weight (Mw) of from about 35,000 to about 150,000, from about 45,000 to about 140,000, and a low molecular weight (LMW) amorphous resin may have an Mw of from about 10,000 to about 30,000, from about 15,000 to about 25,000.

The weight ratio of the two resins may be from about 10% first amorphous resin/90% second amorphous resin, to about 90% first amorphous resin/10% second amorphous resin.

In embodiments, the resin may possess acid groups which, in embodiments, may be present at the terminal of the resin. Acid groups, which may be present, include carboxylic acid groups, and the like. The number of acid groups may be controlled by adjusting the materials utilized to form the resin and reaction conditions.

In embodiments, the resin may be a polyester resin having an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin. The acid-containing resin may be dissolved in, for example, a tetrahydrofuran solution. The acid number may be detected by titration with KOH/methanol solution containing phenolphthalein as the indicator.

The resin particles of interest are no greater than 100 nm in size, that is, are 100 nm or smaller, such as, 99 nm, 98 nm, 97 nm, 96 nm, 95 nm or smaller in size. Thus, resin particles of interest are less than 100 nm in size.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, sometimes referred to herein, in embodiments, as phase inversion agents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be from about 1:2 to about 1:15, from about 1:2.5 to about 1:12.5, from about 1:3 to about 1:10, from about 1:3.5 to about 1:7.5. Thus, if the first solvent is IPA and the second solvent is MEK, the ratio of IPA to MEK can be, for example, about 1:4.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a, "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines and combinations thereof. In embodiments, the monocyclic and polycyclic compounds may be unsubstituted or substituted at any carbon position on the ring.

In embodiments, an emulsion formed in accordance with the present disclosure may also include a small quantity of water, in embodiments, de-ionized water (DIW), in amounts of from about 30% to about 95%, from about 30% to about 60%, at temperatures that melt or soften the resin, of from about 25° C. to about 120° C., from about 35° C. to about 80° C.

The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases are used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 25% to about 300% may be achieved, from about 50% to about 200%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, from about 6 to about 11. The neutralization of the acid groups may, in embodiments, enhance formation of the emulsion.

Surfactants

In embodiments, the process of the present disclosure may optionally include adding a surfactant, for example, before or during the melt mixing, to the resin at an elevated temperature, in an emulsion, in a dispersion and so on. In embodiments, the surfactant may be added prior to melt-mixing the resin at an elevated temperature.

Where utilized, a resin emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, from about 0.1% to about 16% by weight, from about 1% to about 14% by weight of the resin.

Anionic surfactants which may be utilized include sulfates and sulfonates, such as, sodium dodecylsulfate (SDS), sodium dodecylbenzene sulfonate, sodium dodecylnaphthalene sulfate, dialkyl benzenealkyl sulfates and sulfonates, acids, such as, abietic acid available from Aldrich, NEOGEN®, NEOGEN™ obtained from Daiichi Kogyo Seiyaku, combinations thereof and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of those surfactants and any of the foregoing anionic surfactants may be utilized, in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$,$C_{15}$,$C_{17}$-trimethyl ammonium bromides, halide salts of quaternized polyoxyethylalkylamines, dodecylbenzyl triethyl ammonium chloride, MIRAPOL™ and ALKAQUATT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants may include a block copolymer of polyethylene oxide and polypropylene oxide, including those commercially available as SYNPERONIC PE/F, in embodiments, SYNPERONIC PE/F 108. Combinations of those surfactants and any of the foregoing surfactants may be utilized, in embodiments.

Processing

The present process may include melt mixing a mixture at an elevated temperature containing at least one amorphous resin, at least one organic solvent, optionally a surfactant, and a neutralizing agent to form a latex emulsion. In embodiments, the resins may be pre-blended prior to melt mixing.

In embodiments, the elevated temperature may be a temperature near to or above the $T_g$ of the amorphous resins. In embodiments, the resin may be a mixture of low and high molecular weight amorphous resins.

Thus, in embodiments, a process of the present disclosure may include contacting at least one resin with an organic solvent to form a resin mixture, heating the resin mixture to an elevated temperature, stirring the mixture, adding a neutralizing agent to neutralize the acid groups of the resin, adding water dropwise into the mixture until phase inversion occurs to form a phase inversed latex emulsion, distilling the latex to remove a water solvent mixture in the distillate and producing a high quality latex.

In the phase inversion process, the amorphous and/or the combination of at least one amorphous and crystalline polyester resins may be dissolved in low boiling point organic solvents, which solvents are miscible or partially miscible in water, such as, MEK and any other solvent noted hereinabove, at a concentration of from about 1% by weight to about 75% by weight resin in solvent, from about 5% by weight to about 60% by weight resin in solvent. The resin mixture is then heated to a temperature of from about 25° C. to about 90° C., from about 30° C. to about 85° C. The heating need not be held at a constant temperature, but may be varied. For example, the heating may be slowly or incrementally increased until a desired temperature is achieved.

In accordance with processes as disclosed, an amorphous polyester latex may be obtained using a more than one solvent PIE process which requires dispersing and solvent stripping steps. In that process, the amorphous polyester resin may be dissolved in a combination of more than one organic solvents, for example, MEK and IPA, to produce a homogenous organic phase. A fixed amount of base solution (such as, ammonium hydroxide) is then added into the organic phase to neutralize acid end groups of the polyester, followed by the addition of DIW to form a uniform dispersion of polyester particles in water through phase inversion. The organic solvents remain in both the polyester particles and water phase at that stage. Through vacuum distillation, for example, the solvents can be stripped. In embodiments, the resin to two or more solvents (for example, MEK and IPA) ratios may be from about 10:8 to about 10:12, from about 10:8.5 to about 10:11.5, from about 10:9 to about 10:11. When two solvents are used, and an LMW resin is included, the ratio of the LMW resin to the first and to the second solvents can be from about 10:6:1.5 to about 10:10:2.5. When an HMW resin is included with two solvents, the ratio of the IIMW resin to the first and to the second solvents can be from about 10:8:2 to about 10:11:3, although amounts outside of those ranges noted above can be used.

In embodiments, the neutralizing agent includes the agents mentioned hereinabove. In embodiments, a surfactant may or may not be added to the resin, where the surfactant when utilized may be any of the surfactants mentioned hereinabove to obtain a latex with lower coarse content, where a coarse particle is greater than 100 nm in size.

In embodiments, the optional surfactant may be added to the one or more ingredients of the resin composition before, during or after melt-mixing. In embodiments, the surfactant may be added before, during or after addition of the neutralizing agent. In embodiments, the surfactant may be added prior to the addition of the neutralizing agent. In embodiments, a surfactant may be added to the pre-blend mixture prior to melt mixing.

The melt-mixing temperature may be from about 35° C. to about 100° C., from about 40° C. to about 90° C., from about 50° C. to about 70° C.

Once the resins, neutralizing agent and optional surfactant are melt mixed, the mixture may then be contacted with water, to form a latex emulsion. Water may be added to form a latex with a solids content of from about 5% to about 60%, from about 10% to about 50%. While higher water temperatures may accelerate dissolution, latexes may be formed at temperatures as low as room temperature (RT). In embodiments, water temperatures may be from about 40° C. to about 110° C., from about 50° C. to about 90° C.

In embodiments, a continuous phase inversed emulsion may be formed. Phase inversion may be accomplished by continuing to add an aqueous alkaline solution or basic agent, optional surfactant and/or water compositions to create a phase inversed emulsion including a dispersed phase including droplets possessing the molten ingredients of the resin composition and a continuous phase including the surfactant and/or water composition.

Melt mixing may be conducted, in embodiments, utilizing any means within the purview of those skilled in the art. For example, melt mixing may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased. In embodiments, a homogenizer (that is, a high shear device), may be utilized to form the phase inversed emulsion, in embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, the temperature of heating, the stirring speed, and the like, phase inversion may occur when the basic neutralization agent, optional surfactant, and/or water has been added so that the resulting resin is present in an amount from about 5% by weight to about 70% by weight of the emulsion, from about 20% by weight to about 65% by weight, from about 30% by weight to about 60% by weight of the emulsion.

Following phase inversion, additional optional surfactant, water, and/or aqueous alkaline solution may optionally be added to dilute the phase inversed emulsion, although not required. Following phase inversion, the phase inversed emulsion may be cooled to room temperature, for example from about 20° C. to about 25° C.

In embodiments, distillation with stirring of the organic solvent may be performed to provide resin emulsion particles with an average diameter size of less than 100 nm, less than about 95 nm, less than about 90 nm.

The desired properties of the amorphous polyester emulsion (i.e., particle size and low residual solvent level) may be achieved by adjusting the solvent and neutralizer concentration and process parameters (i.e., reactor temperature, vacuum and process time).

The coarse content of the latex of the present disclosure, that is, particles of 100 nm or larger in size, may be from about 0.01% by weight to about 5% by weight, from about 0.1% by weight to about 3% by weight. The solids content of the latex of the present disclosure may be from about 10% by weight to about 60%, from about 20% by weight to about 50% by weight.

Toner

Once the resin mixture has been contacted with water to form an emulsion and the solvent removed from the mixture as described above, the resulting latex may then be utilized to form a toner by any method within the purview of those skilled in the art. The latex emulsion may be contacted with an optional colorant, optionally in a dispersion, and other additives to form an ultra low melt toner by a suitable process, in embodiments, an emulsion aggregation and coalescence process.

In embodiments, the optional additional ingredients of a toner composition including optional colorant, wax and other additives, may be added before, during or after melt mixing the resin to form the latex emulsion of the present disclosure. The additional ingredients may be added before, during or after formation of the latex emulsion. In embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, from about 1 to about 25% by weight of the toner, from about 3 to about 5% by weight of the toner, although the amount of colorant can be outside of those ranges, such as, about 7%, about 7.5%, about 8% by weight of the toner.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S(Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann, Calif.), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (sanofi), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (sanofi), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm PinkE™ (sanofi), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing and the like.

Other suitable water-based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850:1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water-based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Co., Inc., Pigment Violet 1™, Pigment Red 48™, Lemon Chrome Yellow DCC 1026™, E. D. Toluidine Red™ and Bon Red C™ available from Dominion Color Corp., Ltd., Toronto, Calif., Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index (CI) as CI-60710, CI Dispersed Red 15, diazo dye identified in the Color Index as CI-26050, CI Solvent Red 19, and the like. Illustrative examples of cyan include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

Wax

Optionally, a wax may also be combined with the resin and an optional colorant in forming toner particles. The wax may be provided in a wax dispersion, which may include a single type of wax or a mixture of two or more different waxes. A single wax may be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

When included, the wax may be present in an amount of, for example, from about 1% by weight to about 25% by weight of the toner particles, from about 5% by weight to about 20% by weight of the toner particles, although the amount of wax can be outside of those ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, from about 1,000 to about 10,000. Waxes that may be used include, for example, polyolefins, such as, polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes, such as, commercially available from Allied Chemical and Petrolite Corp., for example, POLYWAX™ polyethylene waxes, such as, commercially available from Baker Petrolite, wax emulsions available from Michaelman, Inc. and the Daniels Products Co., EPOLENE N-15™ commercially available from Eastman Chemical Products, Inc., and VISCOL 550-P™, a low weight average molecular weight polypropylene available from Sanyo Kasei K.K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax, such as, waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate and pentaerythritol tetra behenate; ester waxes obtained from higher fatty acid and multivalent alcohol multimers, such as, diethylene glycol monostearate, dipropylene glycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™, SUPERSLIP 6530™ available from Micro Powder Inc., fluorinated waxes, for example, POLYFLUO 190™, POLYFLUO 200™, POLYSILK 19™, POLYSILK 14™ available from Micro Powder Inc., mixed fluorinated, amide waxes, such as, aliphatic polar amide functionalized waxes; aliphatic waxes consisting of esters of hydroxylated unsaturated fatty acids, for example, MICROSPERSION 19™ available from Micro Powder Inc., imides, esters, quaternary amines, carboxylic acids or acrylic polymer emulsion, for example, JONCRYL 74™, 89™, 130™, 537™, and 538™, all available from SC Johnson Wax, and chlorinated polypropylenes and polyethylenes available from Allied Chemical, Petrolite Corp. and SC Johnson wax. Mixtures and combinations of the foregoing waxes may also be used, in embodiments. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 500 nm.

Toner Preparation

The toner particles may be prepared by any method within the purview of one skilled in the art. Although embodiments relating to toner particle production are described below with respect to emulsion aggregation processes, any suitable method of preparing toner particles may be used, including, chemical processes, such as, suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

In embodiments, toner compositions may be prepared by emulsion aggregation processes, such as, a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, that may be by mixing at about 600 to about 6,000 rpm. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}C_{15}C_{17}$-trimethyl ammonium bromides, halide salts of quaternized polyoxyethylalkylamines, dodecylbenzyl triethyl ammonium chloride, combinations thereof and the like.

Other suitable aggregating agents also include, but are not limited to, tetraalkyl titivates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof and the like. Where the aggregating agent is a polyion aggregating agent, the agent may have any desired number of polyion atoms present. For example, suitable polyaluminum compounds have from about 2 to about 13, from about 3 to about 8, aluminum ions present in the compound.

The aggregating agent may be added to the mixture utilized to form a toner in an amount of, for example, from about 0.1% to about 10% by weight, from about 0.2% to about 8% by weight, from about 0.3% to about 5% by weight, of the resin in the mixture.

The particles may be permitted to aggregate until a predetermined desired particle size is obtained. Particle size can be monitored during the growth process, for example with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours, from about hour 1 to about 5 hours, while maintaining stirring, to provide the aggregated particles. Once the predetermined desired particle size is reached, a shell resin can be added.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C., from about 45° C. to about 80° C., which may be below the $T_g$ of the resin as discussed above.

Shell Resin

In embodiments, after aggregation, but prior to coalescence, a resin coating may be applied to the aggregated particles to form a shell thereover. In embodiments, the core may thus include an amorphous resin and/or a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

Multiple resins may be utilized in any suitable amounts. Thus, a first amorphous polyester resin may be present in an amount of from about 20% by weight to about 100% by weight of the total shell resin, from about 30% by weight to about 90% by weight of the total shell resin. In embodiments, a second resin may be present in the shell resin in an amount of from about 0 percent by weight to about 80 percent by weight of the total shell resin, from about 10 percent by weight to about 70 percent by weight of the shell resin.

The shell resin may be applied to the aggregated particles by any method within the purview of those skilled in the art. In embodiments, the resins utilized to form the shell may be in an emulsion, including any surfactant described above. The emulsion possessing the resins, optionally the solvent-based amorphous polyester resin latex neutralized with NaOH described above, may be combined with the aggregated particles described above so that the shell forms over the aggregated particles.

The formation of the shell over the aggregated particles may occur while heating to a temperature of from about 30° C. to about 80° C., from about 35° C. to about 70° C. Formation of the shell may take place for a period of time of from about 5 min to about 10 hr, from about 10 minutes to about 5 hours.

The shell may be present in an amount of from about 10% by weight to about 40% by weight of the latex particles, from about 20% by weight to about 35% by weight of the latex particles.

Once the desired final size of the toner particles is achieved, the pH of the mixture may be adjusted with a base to a value of from about 3 to about 10, from about 5 to about 9. The adjustment of the pH may be utilized to freeze, that is, to stop, toner particle growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

In embodiments, the final size of the toner particles may be less than about 8 μm, less than about 7 μm, less than about 6 μm in size.

Coalescence

Following aggregation to the desired particle size and application of any optional shell, the particles may then be coalesced to the desired final shape, the coalescence being achieved by, for example, heating the mixture to a temperature of from about 45° C. to about 100° C., from about 55° C. to about 99° C., which may be at or above the Tg of the resin(s) utilized to form the toner particles. Coalescence may be accomplished over a period of from about 0.01 to about 9 hours, from about 0.1 to about 4 hours.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles may be optionally washed with water and then dried. Drying may be accomplished by any suitable method for drying, including, for example, freeze-drying.

Additives

In embodiments, the toner particles may contain other optional additives, as desired or required. For example, the toner may include positive or negative charge control agents, for example, in an amount of from about 0.1 to about 10% by weight of the toner, from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in entirety; organic sulfate and sulfonate compositions, including those disclosed in U.S. Pat. No. 4,338,390, the disclosure of which is hereby incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There can also be blended with the toner particles external additive particles after formation including flow aid additives, which additives may be present on the surface of the toner particles. Examples of the additives include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may be used as an external additive for providing lubricating properties, developer conductivity, tribo enhancement and enabling higher toner charge and charge stability by increasing the number of contacts between toner and carrier particles. In embodiments, a commercially available zinc stearate known as Zinc Stearate L, obtained from Ferro Corp., may be used. The external surface additives may be used with or without a coating.

Each of the external additives may be present in an amount of from about 0.1% by weight to about 5% by weight of the toner, from about 0.25% by weight to about 3% by weight of the toner, although the amount of additives can be outside of those ranges. In embodiments, the toners may include, for example, from about 0.1% by weight to about 5% by weight titanic, from about 0.1% by weight to about 8% by weight silica and from about 0.1% by weight to about 4% by weight zinc stearate.

Suitable additives include those disclosed in U.S. Pat. Nos. 3,590,000, 3,800,588 and 6,214,507, the disclosure of each of which hereby is incorporated by reference in entirety.

In embodiments, toners of the present disclosure may be utilized as ultra low melt (ULM) toners.

In embodiments, the dry toner particles having a shell of the present disclosure may, exclusive of external surface additives, have the following characteristics:

(1) volume average diameter (also referred to as "volume average particle diameter") of from about 3 to about 25 μm, from about 4 to about 15 μm, from about 5 to about 12 μm;

(2) number average geometric size distribution (GSDn) and/or volume average geometric size distribution (GSDv) of from about 1.05 to about 1.55, from about 1.1 to about 1.4; and (3) circularity of from about 0.93 to about 1, in embodiments, from about 0.95 to about 0.99 (as measured with, for example, a Sysmex FPIA 2100 analyzer).

The characteristics of toner particles may be determined by any suitable technique and apparatus, such as, a Beckman Coulter MULTISIZER 3.

The subject matter now will be exemplified in the following non-limiting examples. Parts and percentages are by weight unless otherwise indicated. As used herein, "room temperature," (RT) refers to a temperature of from about 20° C. to about 30° C.

EXAMPLES

Example 1

LMW Amorphous Polyester 80 nm Latex

A 1 L glass reactor equipped with an anchor blade was used for phase inversion emulsification of an LMW amorphous polyester resin. The reactor was charged with 70 grams of MEK, 19 grams of IPA, 100 grams of resin (acid value (AV)= 12.5 mgKOH/g, Tg of 59.8° C.) and 3.0 grams of previously prepared 10% ammonium hydroxide. The ratio of resin to MEK to IPA was 10:7:1.9. The anchor impeller was set to 150 rpm. The heating bath was started and 48 minutes later, the temperature reached 61.4° C. with a pressure of 50 kPa. Then, 225 grams of DIW was metered into the reactor at a flow rate of 3.8 g/min over 60 minutes. A phase inversed latex had a particle size of 80 nm as measured using a Nanotrac particle size analyzer. The latex containing the solvents was poured into a glass pan, which was kept in the fume hood, and stirred by magnetic stir bar to evaporate the solvent.

Example 2

HMW Amorphous Polyester 84 nm Latex

A 1 L glass reactor equipped with an anchor blade was used for phase inversion emulsification of the HMW amorphous polyester resin. The reactor was charged with 135 grams of MEK, 37.5 grams of IPA and 150 grams of resin (AV—12.2 mgKOH/g, Tg—56.4). The ratio of resin to MEK to IPA was 10:9:2.5. The anchor impeller was set to 150 rpm. The heating bath was started and 110 minutes later, the temperature reached 59.5° C. The dissolved resin was neutralized by adding 4.35 grams of previously prepared 10% ammonium hydroxide in water over a period of 2 minutes. The mixture was left to mix for 12 minutes. Then, 337.5 grams of DIW was metered into the reactor at a flow rate of 5.6 g/min over 60 minutes. A phase inverted latex had a particle size of 84 nm as measured using a Nanotrac particle analyzer. The latex containing the solvents was poured into a glass pall, which was kept in the fume hood, and stirred by a magnetic stir-bar to evaporate the solvent.

Table 1 lists the molecular weight and $T_g$ of the raw resins and the resulting latex. Analysis showed with the new PIE process, $T_g$ does not affect performance of the latex, with little effect on toner fusing performance.

TABLE 1

| Experiment | Resin | Particle Size (nm) | $M_w$ (kg/mol) | $M_a$ (kg/mol) | Polydispersity | $T_g$ (C.) |
|---|---|---|---|---|---|---|
| Raw Material | LMW | / | 19.1 | 4.6 | 4.2 | 59.2 |
| Latex | LMW | 80 | 19.0 | 4.6 | 4.1 | 58.2 |
| Raw Material | HMW | / | 129.5 | 5.4 | 24.1 | 56.4 |
| Latex | IIMW | 84 | 126.7 | 4.2 | 30.3 | 55.6 |

Example 3

Black EA Toner with Large Latex Particle Size (Control)

A black polyester EA toner was prepared at the 2L bench scale (179 g dry theoretical toner). The two amorphous emulsions (101 g LMW at 36% solids and particle size 180 nm and 103 g HMW at 35% solids and particle size 180 nm), 34 g crystalline emulsion (36% solids and particle size 220 nm), 5.06 g surfactant (DOWFAX), 51 g wax (IGI), 96 g black pigment (Nipex-35), 16 g cyan pigment (PB 15:3 dispersion) and 506 g DIW were mixed in a 2L beaker and the pH adjusted to 4.2 using 0.3M nitric acid. The slurry then was homogenized for 5 minutes at 3000-4000 rpm while adding coagulant, 3.14 g aluminum sulphate mixed with 36.1 g of DIW. The slurry then was transferred to the 2L Buchi and set to mix at 460 rpm. The slurry then was aggregated at a batch temperature of 42° C. During aggregation, a shell comprised of the same amorphous emulsion as in the core was pH adjusted to pH 3.3 with nitric acid and added to the batch, then the batch incubated to achieve the targeted particle size. Once at the target particle size, aggregation was halted with pH adjustment to 7.8 using sodium hydroxide (NaOH) and EDTA. The process was allowed to proceed with the reactor temperature (Tr) being increased to reach 85° C. Once the desired temperature was reached, the pH was adjusted to 6.5 using pH 5.7 sodium acetate/acetic acid buffer where the particles began to coalesce. After about 2 hours, particles achieved >0.965 circularity and were quenched cooled with ice. The final toner particle size, GSDv, and GSDn were 5.31/1.20/1.23, respectively. The fines (1.3-4 μm), coarse (>16 μm) and circularity were 20.8%, 0.08% and 0.974.

Example 4

Black EA Toner with Small Latex Particle Size (Experimental)

A black polyester EA toner was prepared at the 2L bench scale (175 g dry theoretical toner). The two amorphous emulsions (115 g LMW at 27% solids and particle size 80 nm) and 87 g HMW (36% solids and particle size 84 nm), 73 g crystalline emulsion (14% solids and particle size 85 nm), 5.06 g surfactant (DOWFAX), 51 g wax (IGI), 96 g black pigment (Nipex-35), 16 g cyan pigment (PB 15:3 dispersion), and 511 g DIW were mixed in a 2L beaker and the pH was adjusted to 4.2 using 0.3M nitric acid. The slurry was homogenized for 5 minutes at 3000-4000 rpm while adding coagulant, 3.14 g aluminum sulphate mixed with 36.1 g DIW. The slurry was then transferred to the 2L Buchi and set mixing at 460 rpm. The slurry then was aggregated at a batch temperature of 47° C. During aggregation, a shell composed of the same amorphous emulsions as in the core was pH adjusted to 3.3 with nitric acid and added to the batch. The batch was incubated to achieve the targeted particle size. The process was allowed to proceed with the reactor temperature (Tr) being increased to reach 85° C. Once the desired temperature was reached, the pH was adjusted to 6.5 using pH 5.7 sodium acetate/acetic acid buffer where the particles began to coalesce. After about 2 hours, particles achieved >0.965 circularity and were quenched cooled with ice. The final toner particle size, GSDv and GSDn were 5.71/1.23/1.29, respectively. The fines (1.3-4 μm), coarse (>16 μm) and circularity were 22.2%, 0.97% and 0.977.

Charging Results

The toner prepared with small latex showed higher parent and additive charge with an improvement in dielectric loss. For example, 60 minute additive charge was assessed both for q/d and tribo for toner made from larger particles and from small particles. The larger particles had a q/d in the A zone of −4.4 mm and in the C zone, −9.8 mm. On the other hand the additive q/d for toner made with smaller particles was −5.3 and 11.6 in the A and C zones respectively. The 10 minute parent charge in the B zone was determined practicing known materials and methods. For toner made with larger particles, q/d was −10.6 and the tribo was 82. On the other hand, for toner made with smaller particles had corresponding values of −12.7 and 86 for q/d and tribo. Dielectric loss of the toner with larger particles was 88 whereas the loss was only 62 for the toner made with smaller particles.

Due to high conductivity of some pigments, such as, carbon black, previous hyperpigmented black toners have lower charging with high dielectric loss, both of which reduce transfer efficiency and degrade image quality. However, with pigment loading increased by 45% to enable low TMA, using latex less than about 100 nm in size enables hyperpigmented toner particles with good charging.

While not being bound by theory, low toner mass area (TMA) toner with small particle size latex (i.e., less than about 100 nm) allows for better dispersion of carbon black pigment particles, and thus, improves dielectric loss. Again, while not being bound by theory, the small size latex contributes more surface area with the same acid groups, resulting in higher toner surface charge.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A toner particle comprising a resin particle comprising a high molecular weight amorphous resin less than 90 nm in size and a low molecular weight amorphous resin less than 90 nm in size, an optional colorant and an optional wax, wherein said toner particle has lower dielectric loss than a comparable toner particle comprising a resin particle greater than 100 nm in size.

2. The toner particle of claim 1, further comprising a crystalline resin.

3. The toner particle of claim 1, wherein said colorant comprises at least 7.5 wt % of said toner particle.

4. The toner particle of claim 1, wherein said colorant comprises a black colorant.

5. The toner particle of claim 1, comprising a low molecular weight amorphous resin having a molecular weight of from about 10,000 to about 30,000.

6. The toner particle of claim 1, comprising a high molecular weight amorphous resin having a molecular weight of from about 35,000 to about 150.000.

7. The toner particle of claim 1, comprising an ultra low melt toner.

8. The tone particle of claim 1, comprising about 75 wt % amorphous resin.

9. The toner particle of claim 1, comprising a minimum fix temperature of from about 100° C. to about 130° C.

10. The toner particle of claim 1, comprising a hyperpigmented toner.

11. The toner particle of claim 1, comprising a wax in an amount from about 1% by weight to about 25% by weight of the particle.

12. The toner particle of claim 1, comprising a shell.

13. The toner particle of claim 12, wherein said shell comprises a resin particle less than 100 nm in size.

* * * * *